United States Patent
Lin et al.

(10) Patent No.: US 6,724,933 B1
(45) Date of Patent: Apr. 20, 2004

(54) MEDIA SEGMENTATION SYSTEM AND RELATED METHODS

(75) Inventors: Tong Lin, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 09/627,762

(22) Filed: Jul. 28, 2000

(51) Int. Cl.$^7$ .............................. G06K 9/46; G06K 9/62; G09G 5/02; H04N 9/64
(52) U.S. Cl. ..................... 382/164; 382/165; 382/170; 382/171; 382/173; 382/278; 348/700; 345/591
(58) Field of Search ................................. 382/162, 164, 382/165, 170, 171, 173, 278, 168; 348/700; 345/591

(56) References Cited

U.S. PATENT DOCUMENTS

| | | | | |
|---|---|---|---|---|
| 5,635,982 A | * | 6/1997 | Zhang et al. | 348/231.99 |
| 5,708,767 A | * | 1/1998 | Yeo et al. | 345/440 |
| 6,195,458 B1 | * | 2/2001 | Warnick et al. | 382/173 |
| 6,272,250 B1 | * | 8/2001 | Sun et al. | 382/224 |
| 6,389,168 B2 | * | 5/2002 | Altunbasak et al. | 382/224 |

OTHER PUBLICATIONS

Zheng et al, Video parsing, retrieval and browsing: an integrated and conten–based solution, Proc of 3rd ACM Internt'l Conf on Multimedia, Nov. 5–9, 1995, p 15–24.*

Zhang et al, Digital video analysis and recognition for content–based access, ACM Computing Surveys, vol 27, iss 4, Dec. 1995, p 643–644.*

Gunsel et al, Hierarchical Temporal Video Segmentation and Content Characterization, Proc SPIE, Oct. 1997, vol 3229, p 46–56.*

Corridoni et al, Structured Representation and Automatic Indexing of Movie Information Content, Pattern Recognition, 1998, vol 31, iss 12, p 2027–2045.*

Kender et al, Video scene segmentation via continuous video coherence, Proc IEEE Computer Society Conference on Computer Vision and Pattern Recognition, Jun. 23–25, 1998, p 367–373.*

Yong Rui et al, Exploring video structure beyond shots, IEEE Internat'l Conf on Multimedia Computing and Systems, Jun. 28–Jul. 1, 1998, p. 237–240.*

Jincheng Huang et al, Integration of audio and visual information for content–based video segmentation, Proc Internat'l Conf on Image Processing, Oct. 4–7, 1998, vol 3, p 526–529.*

Wei–Ying Ma et al, Benchmarking of image features for content–based retrieval, Conf Record of the 32nd Asilomar Conf on Signals, Systems & Computers, Nov. 1–4, 1998, vol 1, p 253–257.*

Hanjalic et al, Automated high–level movie segmentation for advanced video–retrieval systems, IEEE Transactions on Circuits and Systems for Video Technology, Jun. 1999, vol 9, iss 4, p 580–588.*

Sundaram et al, Video scene segmentation using video and audio features, IEEE Internat'l Conf on Multimedia and Expo, Jul. 30–Aug. 2, 2000, vol 2, p 1145–1148.*

(List continued on next page.)

Primary Examiner—Bhavesh M. Mehta
Assistant Examiner—Christopher Sukhaphadhana
(74) Attorney, Agent, or Firm—Lee & Hayes, PLLC

(57) ABSTRACT

A method comprising receiving media content and analyzing one or more attributes of successive shots of the received media. Based, at least in part on the analysis of the one or more attributes, generating a correlation score for each of the successive shots, wherein scene segmentation is performed to group semantically cohesive shots.

51 Claims, 7 Drawing Sheets

OTHER PUBLICATIONS

Hao Jiang et al, Video Segmentation with the assistance of audio content analysis, IEEE Internat'l Conf on Multimedia and Expo, Jul. 30–Aug. 2, 2000, vol 3, p 1507–1510.*

Tong Lin et al, Automatic video scene extraction by shot grouping, Proc of 15th Internat'l Conf on Pattern Recognition, Sep. 3–7, 2000, vol 4, p 39–42.*

Dictionary.com/correlation, http://dictionary.reference.com/search?q=correlation.*

Dictionary.com/semantic, http://dictionary.reference.com/search?q=semantic.*

"Video Parsing, Retrieval and Browsing: An Integrated and Content–Based Solution", Zhang, Low, Smoliar and Wu, ACM Multimedia 95—Electronic Proceedings, Nov. 1995, pp. 1–20.

"Digital Video Analysis and Recognition for Content–Based Access", Zhang and Tian, ACM Computing Surveys, vol. 27, No. 4, Dec. 1995.

"Automatic Video Scene Extraction by Shot Grouping".

* cited by examiner

Frame 302    Frame 304

MEDIA SEGMENTATION SYSTEM AND RELATED METHODS

TECHNICAL FIELD

This invention generally relates to image processing and, more particularly, to a media segmentation system and related methods.

BACKGROUND

With recent improvements in processing, storage and networking technologies, many personal computing systems have the capacity to receive, process and render multimedia objects (e.g., audio, graphical and video content). One example of such computing power applied to the field of multimedia rendering, for example, is that it is now possible to "stream" video content from a remote server over a network to an appropriately configured computing system for rendering on the computing system. Many of the rendering systems provide functionality akin to that of a typical video cassette player/recorder (VCR). However, with the increased computing power comes an increased expectation by consumers for even more advanced capabilities. A prime example of just such an expectation is the ability to rapidly access relevant (i.e., of particular interest to the user) media content. Prior art systems fail to meet this expectation.

To accommodate and access the vast amount of media, a variety of image database and visual information systems have become available recently. Such systems have been used in a wide variety of applications, including medical image management, CAD/CAM systems, criminal identification systems, clip-art galleries and the like. Prior art systems may employ any of a number of search techniques to access and retrieve relevant information. By and large, such prior art systems utilize a text-based, keyword approach for indexing and retrieving such media content. In accordance with such an approach, each frame, shot or scene (each comprised of one or more of the former) is stored as a database object, wherein each image (e.g., frame, shot, scene) in the database is associated with a manually generated text description of that object. These keyword descriptors may then be searched by standard Boolean queries, where the retrieval is based on either exact or probabilistic matches of the query text.

While such prior art systems have served to whet the appetite for such technology, none of the prior art systems facilitate true content-based media searching and, thus, fail to fully address the need to accurately access and retrieve specific media content. There are several problems inherent in systems that are exclusively text-based. Automatic generation of the descriptive keywords or extraction of semantic information required to build classification hierarchies is beyond the current capability of computing vision and intelligence technologies. Consequently, the text descriptions of such images must be manually generated. It is to be appreciated that the manual input of keyword descriptors is a tedious, time-consuming process prone to inaccuracies and descriptive limitations. Moreover, certain visual properties, such as textures and patterns are often difficult, if not impossible, to adequately or accurately describe with a few textual descriptors, especially for a general-purpose indexing and retrieval applications.

While other approaches have been discussed which attempt to qualitatively segment media based on content, all are computationally expensive and, as a result, are not appropriate for near real-time consumer application. These prior art approaches typically attempt to identify similar material between frames to detect shot boundaries. Those skilled in the art will appreciate that a shot boundary often denotes an editing point, e.g., a camera fade, and not a semantic boundary. Moreover, because of the computational complexities involved, such shots are often defined as a static, or fixed number of frames preceding or succeeding an edit point (e.g., three frames prior, and three frames subsequent). In this regard, such prior art systems typically utilize a fixed window of frames to define a shot.

In contrast, scenes are comprised of semantically similar shots and, thus, may contain a number of shot boundaries. Accordingly, the prior art approaches based on visual similarity of frames between two shots often do not to produce good results, and what needed is a quantitative measure of semantic correlation between shots to identify and segment scenes.

Thus, a media segmentation system and related methods is presented, unencumbered by the inherent limitations commonly associated with prior art systems.

SUMMARY OF THE INVENTION

This invention concerns a media segmentation system and related methods, facilitating the rapid access and retrieval of media content at a semantic level. According to an exemplary implementation of the present invention, a method is presented comprising receiving media content and analyzing one or more attributes of successive shots of the received media. Based, at least in part on the analysis of the one or more attributes, generating a correlation score for each of the successive shots, wherein scene segmentation is performed to group semantically cohesive shots.

BRIEF DESCRIPTION OF THE DRAWINGS

The same reference numbers are used throughout the figures to reference like components and features.

DETAILED DESCRIPTION

This invention concerns a content-based scene segmentation system and related methods. In this regard, the present invention overcomes a number of the limitations commonly associated with the prior art image storage and retrieval systems which primarily rely on textual keywords. The inventive nature of the present invention will be developed within the context of visual media content. It is to be appreciated, however, that the invention is not so limited, and that the innovative media analysis agent introduced below may well utilize the inventive concepts described herein to perform content-based media segmentation on any of a wide variety of multimedia content including, for example, audio content, graphical content, and the like. In this regard, the example embodiments presented below are merely illustrative of the scope and spirit of the present invention.

In describing the present invention, example network architectures and associated methods will be described with reference to the above drawings. It is noted, however, that modification to the architecture and methods described herein may well be made without deviating from the present invention. Indeed, such alternate embodiments are anticipated within the scope and spirit of the present invention.

Example Computing System

Figure 1:
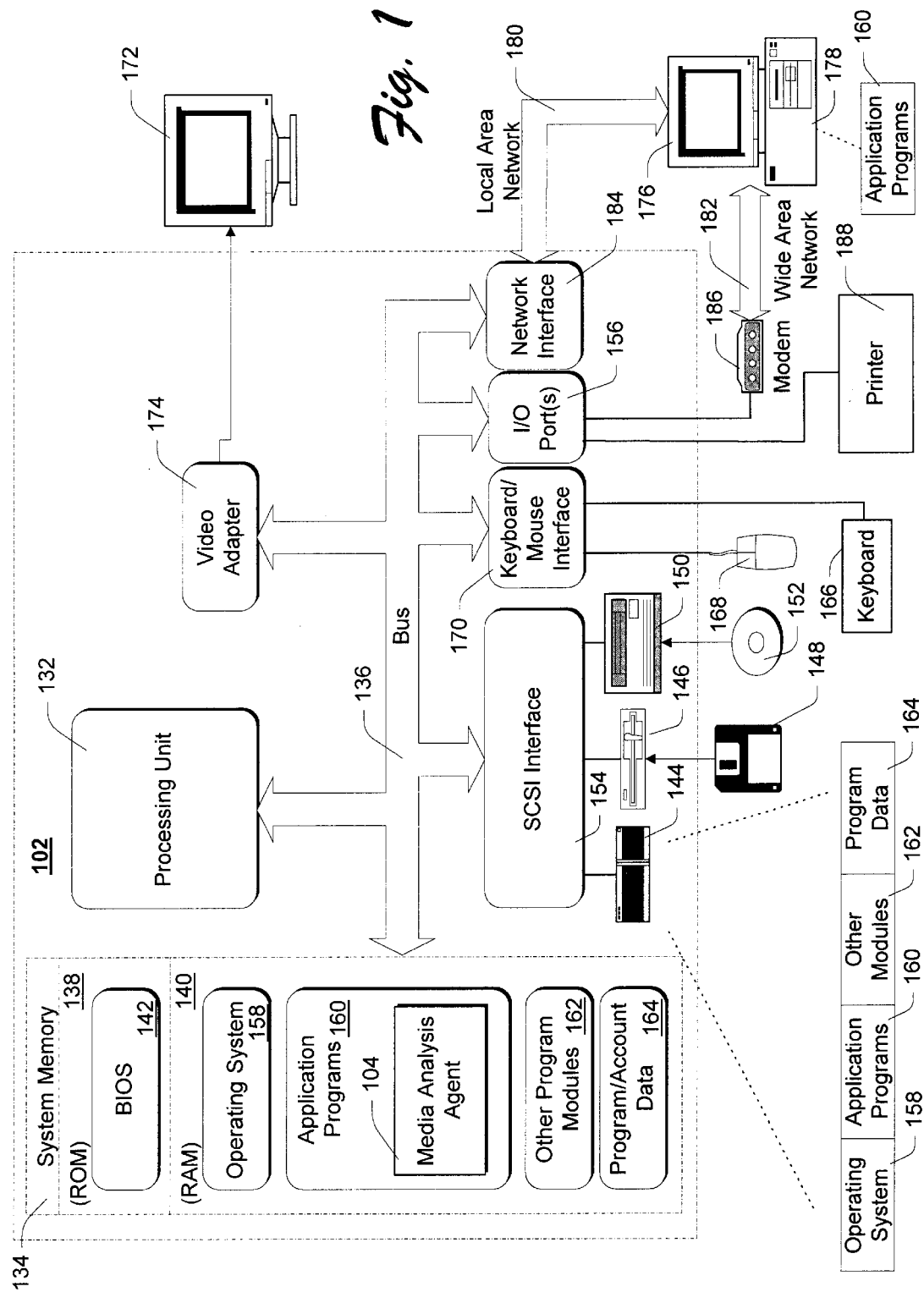
FIG. 1 is a block diagram of an example computing system incorporating the teachings of the present invention.

FIG. 1 illustrates an example computer system 102 including an innovative media analysis agent 104, which analyzes media content to identify one or more objects within each frame of a shot, and segments shots containing like objects into scenes for storage and subsequent content-based access and retrieval. As introduced above, and will be appreciated based on the description to follow, the analysis agent 104 may well be used to identify and segment other types of media for purposes of content-based searches without deviating from the spirit and scope of the present invention. It should be appreciated that although depicted as a separate, stand alone application in FIG. 1, analysis agent 104 may well be implemented as a function of an application, e.g., a media player, a media library, a ripper application, etc. It will be evident, from the discussion to follow, that computer 102 is intended to represent any of a class of general or special purpose computing platforms which, when endowed with the innovative analysis agent 104, implement the teachings of the present invention in accordance with the first example implementation introduced above. It is to be appreciated that although analysis agent 104 is depicted in the context of FIG. 1 as a software application, computer system 102 may alternatively support a hardware implementation of agent 104 as well. In this regard, but for the description of analysis agent 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the example operating environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, analysis agent 104 incorporating the teachings of the present invention, other program modules 162, and program data 164 (e.g., resultant language model data structures, etc.). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1. In this regard, innovative analysis agent 104 may well be invoked and utilized by remote computing systems such as, for example, computing system 176.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via input/output (I/O) interface 156. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Media Analysis Agent

Figure 2:
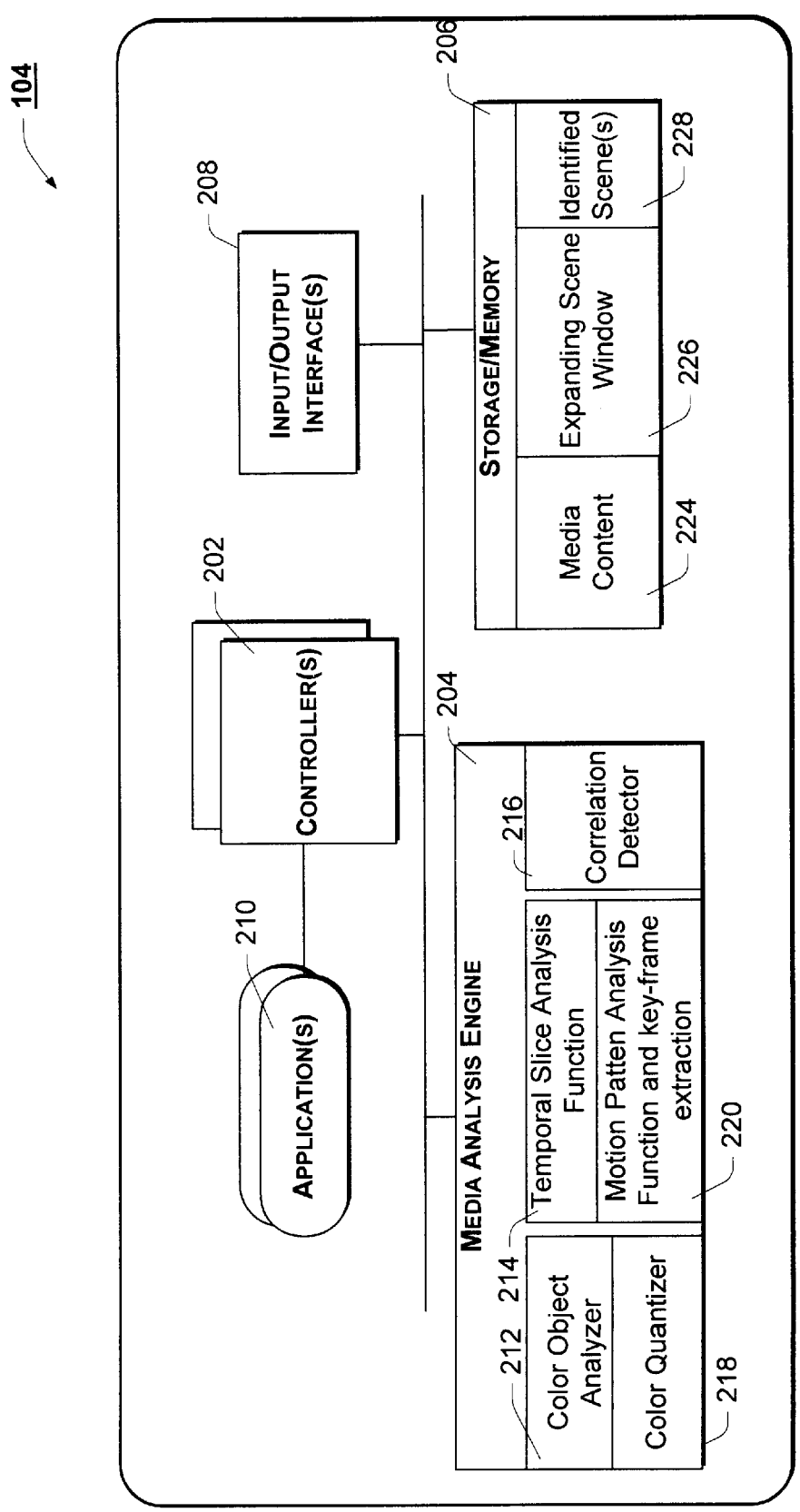
FIG. 2 is a block diagram of an example media analysis agent to perform content-based scene segmentation, in accordance with one example embodiment of the present invention.

FIG. 2 illustrates a block diagram of an example media analysis agent 104 incorporating the teachings of the present invention, according to one implementation of the invention. In accordance with the illustrated example embodiment of FIG. 2, media analysis agent 104 is depicted comprising one or more controller(s) 202, a media analysis engine 204, memory/storage device 206, input/output interface(s) and, optionally, one or more applications 210, each communicatively coupled as shown. As introduced above, media analysis agent 104 analyzes content of received media frames to segment the media into disparate scenes based, at least in part, on one or more attributes of the content of the received media.

In accordance with one example implementation of the present invention, media analysis agent 104 may selectively invoke one or more of a color-object analyzer 212, a temporal slice analysis function 214 and a correlation detector 216 to identify and segment media scenes. According to one embodiment, either color object analyzer 212 or temporal slice analysis function are invoked in combination with correlation detector 216 to identify semantic similarity between shots, facilitating scene detection and segmentation. As shown, color object analyzer includes a color space quantizer 218. Temporal slice analysis function 214 is depicted comprising motion pattern analysis and key-frame extraction function 220, to be described in greater detail, below. As shown, storage/memory 206 includes memory for one or more of received media content 224, an expanding scene window data structure 226 and/or an identified scene(s) data structure 228. As will be discussed in greater detail below, the media analysis engine 204 analyzes one or more attributes of the received media (e.g., color, texture, spatio-temporal information, etc.) to identify semantic similarity between shots. Based, at least in part on the analysis of semantic similarity, media analysis engine 204 segments the received media into scenes for subsequent content-based access and retrieval.

It is to be appreciated that, although depicted as a number of disparate functional blocks, one or more of elements 202–228 may well be combined into one or more blocks. Similarly, analysis agent 104 may well be practiced with fewer functional blocks, i.e., with only one of object identification function 212 or temporal slice analysis function 214, without deviating from the spirit and scope of the present invention.

Figure 7:
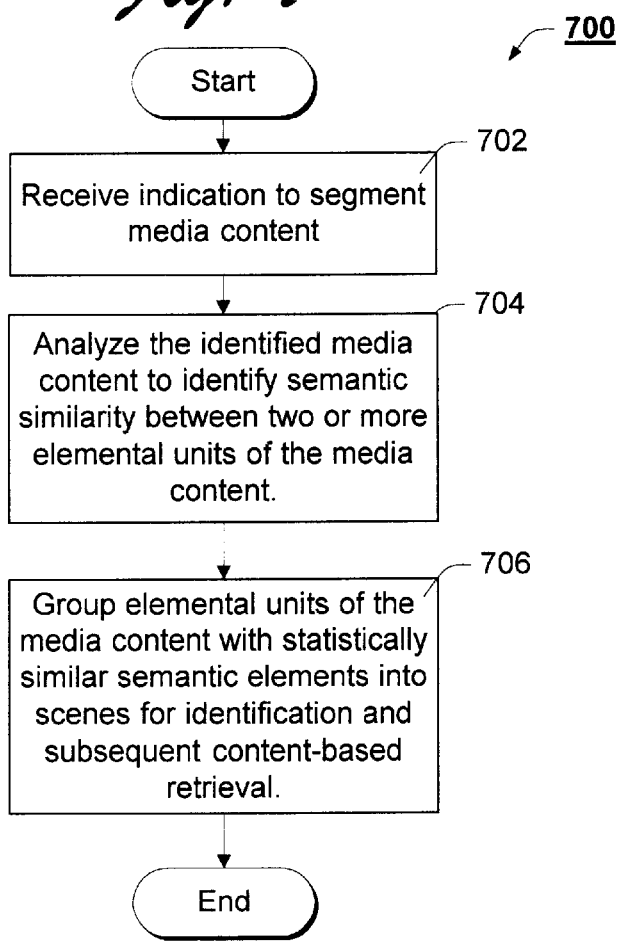
FIG. 7 is a flow chart of an example method for content-based scene segmentation, in accordance with one example embodiment of the present invention.

According to one implementation, controller(s) 202 receive media content from any of a number of sources including, for example, local memory storage (206), remote media provider(s) and/or content storage source(s) communicatively coupled to media analysis agent 104 via a network (see, e.g., FIG. 7). According to one implementation, the media content is received from remote sources by controller(s) 202 and placed in storage/memory 224 for analysis. According to one implementation, the media is received by the host computer 102 in compressed form and is decompressed before presentation to media analysis agent 104. In an alternate implementation, controller(s) 202 selectively invoke a decoder application (e.g., 210) resident within media analysis agent 104 to decode media received in compressed form before selectively invoking the media analysis engine 204. But for the innovative aspects of the invention, described above, controller(s) 202 is intended to represent any of a wide variety of control logic known in the art such as, for example, a processor, an application specific integrated circuit (ASIC), a field programmable gate array (FPGA), a programmable logic array (PLA), and the like. Moreover, it should be appreciated that controller(s) 202 may well be implemented in software as a plurality of executable instructions which, when executed (e.g., by processing unit 132), implement the control functions described above.

Media analysis engine 204 is selectively invoked by controller(s) 202 to identify the semantic correlation between shots of received media in order to accurately segment the media into scenes. Unlike prior art systems which, at best, identify visual similarity between frames to identify shot boundaries, media analysis engine 204 selectively invokes one or more semantic, context analyzers 212 and/or 214 to quantify one or more qualitative attributes of frames within successive shots. As will be discussed in greater detail below, the quantification of these attributes are submitted to correlation detector 216 to determine whether the shots are semantically correlated, or similar. If a threshold of similarity is met, the shots are grouped as at least a subset of a scene.

In accordance with the illustrated example of FIG. 2, media analysis engine 204 is depicted comprising two (2) semantic context media analyzers: color object analyzer 212 and temporal slice analysis function 214. It will be appreciated from the description to follow, that one or more of the media analyzers can be invoke for scene segmentation. Accordingly, media analysis engines of greater or lesser semantic analysis capability may well be substituted for the illustrated embodiment without deviating from the spirit and scope of the present invention.

Color Object Analyzer

As shown, color object analyzer 212 includes a color quantizer 218. Unlike prior art approaches which measure visual similarity, color object analyzer 212 invokes color quantizer to calculate color histograms in a color space for one or more of dominant objects and/or environment objects of one or more frames within successive shots. According to one implementation, the hue, saturation and value, or "HSV", color space is used for color qualization and to calculate the histograms. The HSV color space provides a number of advantages for this analysis over other color spaces since it is natural and approximately perceptually uniform, such that a quantization of the HSV color space produces a collection of colors that is compact, yet complete. According to one implementation, the HSV color space is quantized by color quantizer 218 by a three-dimensional (3D) Cartesian coordinate system with ten (10) values for X and Y, and five (5) values for Z (lightness), respectively. Those skilled in the art will appreciate that using ten values to denote color (i.e., the X and Y coordinates) enables color quantizer 218 to discriminate between even slightly different colors in the HSV space to discriminate more objects, even under varying lighting conditions.

To determine dominant color objects of a video shot, the pixels of each frame, and/or DC blocks in intra-encoded (I) frame(s) of the shot are projected into the quantized color space (e.g., HSV color space) by color quantizer 218. The normalized distribution of these pixels in the 3D color space forms a 3D color histogram of the frame. All dominant local maximum points in the 3D color histogram are identified; and a sphere surrounding each local maximum point within a small neighborhood (e.g., with a diameter of 3 quantization units) in the color space is defined by color quantizer 218 as a color object (see, e.g., FIG. 3). Once the color objects are identified, color object analyzer 212 identifies one or more objects with the most pixel information. These objects are identified as containing the most significant color information for the frame, and are more resilient to noise. According to one implementation, color object analyzer 212 selects the top twenty (20) objects as the dominant objects.

Color object analyzer 212 then generates a 3D dominant color histogram for each frame by counting only pixels included in dominant color objects. According to one implementation, the dominant color histogram is denoted as:

$$hist_d(k,x,y,z) \qquad (1)$$

where k denotes the frame number, and x,y,z denotes a color bin. It should be appreciated, given the foregoing, that color object analyzer 212 does not perform object segmentation in the spatial domain, but consider pixels falling into a dominant region in the color space of an object.

Once the dominant objects are identified, color object analyzer 212 tracks the objects in the color space across frames to identify dominant objects of a shot. If the centers of two color objects in two consecutive frames are sufficiently close, these two color objects are recognized as the same color object. Such a color tracking process continues until all frames in the shot are tracked. After tracking, only the color objects that have the longest durations in a shot are retained as dominant objects. According to one implementation, color object analyzer 212 forms an overall dominant color histogram for each shot, represented as:

$$hist_d^a(x,y,z) \qquad (2)$$

where a denotes a shot. The overall dominant color histogram consists of dominant color objects which are common to frames across the shot. According to one implementation, color object analyzer 212 applies a weighting value to color objects with longer duration in a shot, mathematically represented as:

$$hist_d^A(x, y, z,) = hist_d^a(x, y, z) \times \frac{d_l}{d_o} \qquad (3)$$

where $d_o$ is the duration of the shot, and $d_l$ is the duration of the dominant color object with color (x,y,z). According to one implementation, color object analyzer 212 further refines histogram (3) by normalizing the mean size of each dominant color object within the shot. Therefore, the dominant color histogram of a shot represents both structural content in a frame and temporal content in a shot. Also, these dominant color objects often represent dominant objects or background in a shot and the correlation between these color objects in two shots is a good indication of correlation between the two shots.

Figure 3:
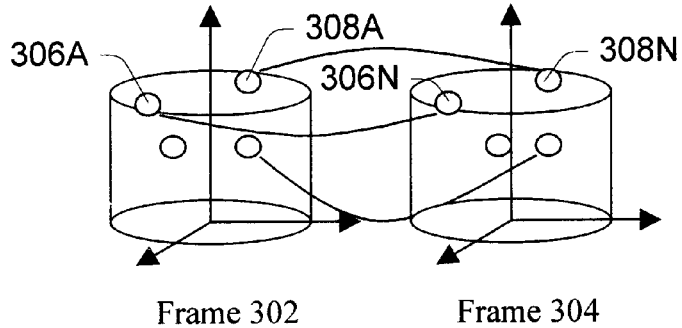
FIG. 3 is a graphical illustration denoting color object segmentation and tracking, in accordance with one aspect of the present invention.

Turning briefly to FIG. 3, a graphically illustration of an example HSV color space populated with identified objects is presented, in accordance with one aspect of the present invention. As shown, two HSV color space cylinders are depicted, one each representing frame (N) 302 and frame (N+1) 304, for example. The HSV color histograms 302 and 304 are used to identify dominant color objects (e.g., 306A . . . N, 308A . . . N) within the associated frames (302, 304), to identify dominant color objects within a shot. Subsequently, such HSV color histograms are utilized to identify dominant color objects for scene segmentation.

With continued reference to FIG. 2, once the dominant color object histograms are generated by color object analyzer 212, controller(s) 202 selectively invoke an instance of correlation detector 216 to develop a correlation score between two shots, a and b. Correlation detector 216 may use any of a number of statistical techniques to identify the correlation between shots. According to one example implementation, correlation detector 216 calculates the correlation between shots a and b by calculating the histogram intersection between two dominant color histograms of the two shots, mathematically represented as:

$$Cor(a,b)=\Sigma x \Sigma y \Sigma z \; \min[hist_d^A(x,y,z), hist_d^B(x,y,z)] \qquad (4)$$

having the properties:
1) $0 \leq cor(a,b) \leq 1$, $cor(a,a)=1$
2) $cor(a,b)=cor(b,a)$ Expanding Window Scheme for Shot Grouping Based, at least in part, on the correlation analysis performed by correlation detector 216, controller(s) 202 group shots to segment the media into scenes. According to one example implementation, controller(s) 202 group shots that meet a minimum correlation threshold (Tc).

According to one aspect of the present invention, controller(s) 202 utilize an expanding window 218 of memory 206 to group correlated consecutive shots into one scene based, at least in part, on the correlation scores derived by correlation detector 216. It is to be appreciated, based on the discussion to follow, the expanding window technique eliminates the need to compare many shot pairs or construct complex shot links, thereby reducing the computational complexity of the implementation.

Rather, considering the temporal constraints, i.e., shots that are closer to each other in time are more likely to belong to the same scene, the correlation score between two shots is weighted by a temporal proximity (or, attraction) factor:

$$w=1/(1+d/C) \tag{5}$$

where d is the minimum distance between the two shots, and C is a constant determined, at least in part, by the average shot length. According to one implementation, controller(s) 202 assumes that every scene should contain at least three shots. Initially, the first three shots form a new scene, and the size of the expanding window is set to three. Every time a new shot analyzed, its correlation score is compared with the last three shots in the window and the maximum, v among the three correlation scores is determined. Then, if the calculated maximum is greater than the mean maximum correlation scores, minus any variation, of the shots contained within the expanding window, the shot is absorbed into the current scene in the expanding window. Mathematically, the comparison performed by controller(s) 202 is represented as:

$$v > \text{mean-var} \tag{6}$$

If the maximum (v) does not meet this threshold, a few more subsequent shots are analyzed to improve the confidence that the current shot represents the beginning of a new scene. It has been empirically determined that there is often one shot in a scene that does not meet the foregoing requirements to be included within the scene. However, analysis of additional subsequent shots may confirm that the current shot does not represent the end of a semantic scene. If controller 202 determines that one or more subsequent shots meet criteria (6), any preceding shots may be included in the scene being developed in the expanding window 218. Mathematically, controller(s) 202 develop an attraction ratio of the current shot i toward a new scene as:

$$R(i)=(\text{right}(i)+\text{right}(i+1))/(\text{left}(i)+\text{left}(i+1)) \tag{7}$$

where: left(i)=max{cor(i,i−1), cor(i,i−2), cor(i,i−3)}
left(i+1)=max{cor(i+1,i−1),cor(i+1,i−2)}
right(i)=max{cor(i,i+1), cor(i,i+2), cor(i,i+3) }
right(i+1)=max{cor(i+1,i+2), cor(i+1, i+3), cor(i+1,i+4)}
if: R(i)>T and R(i)>R(i−1) and R(i)>R(i+1), where T is a threshold.
According to one implementation, controller(s) 202 set threshold T to 1.5. Accordingly, where the attraction to shot i form the right side is greater than from the left side, the current shot i is determined to start a new scene. Otherwise, controller 202 places shot i in the current scene of the expanding window. The expanding window is graphically illustrated with reference to FIGS. 4 and 5, below.

Figure 4:
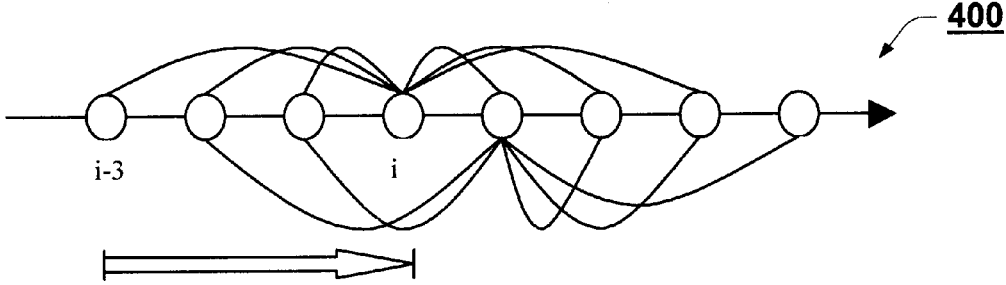
FIG. 4 is a graphical illustration denoting the expanding window shot grouping technique, in accordance with one aspect of the present invention.

Turning briefly to FIG. 4, a graphical representation of adding shots to an expanding scene window based, at least in part, on the foregoing correlation measures is depicted. As shown, controller 202 compares correlation values of shots against precedent and successive shots to identify which scene each of the shots should be placed.

Figure 5:
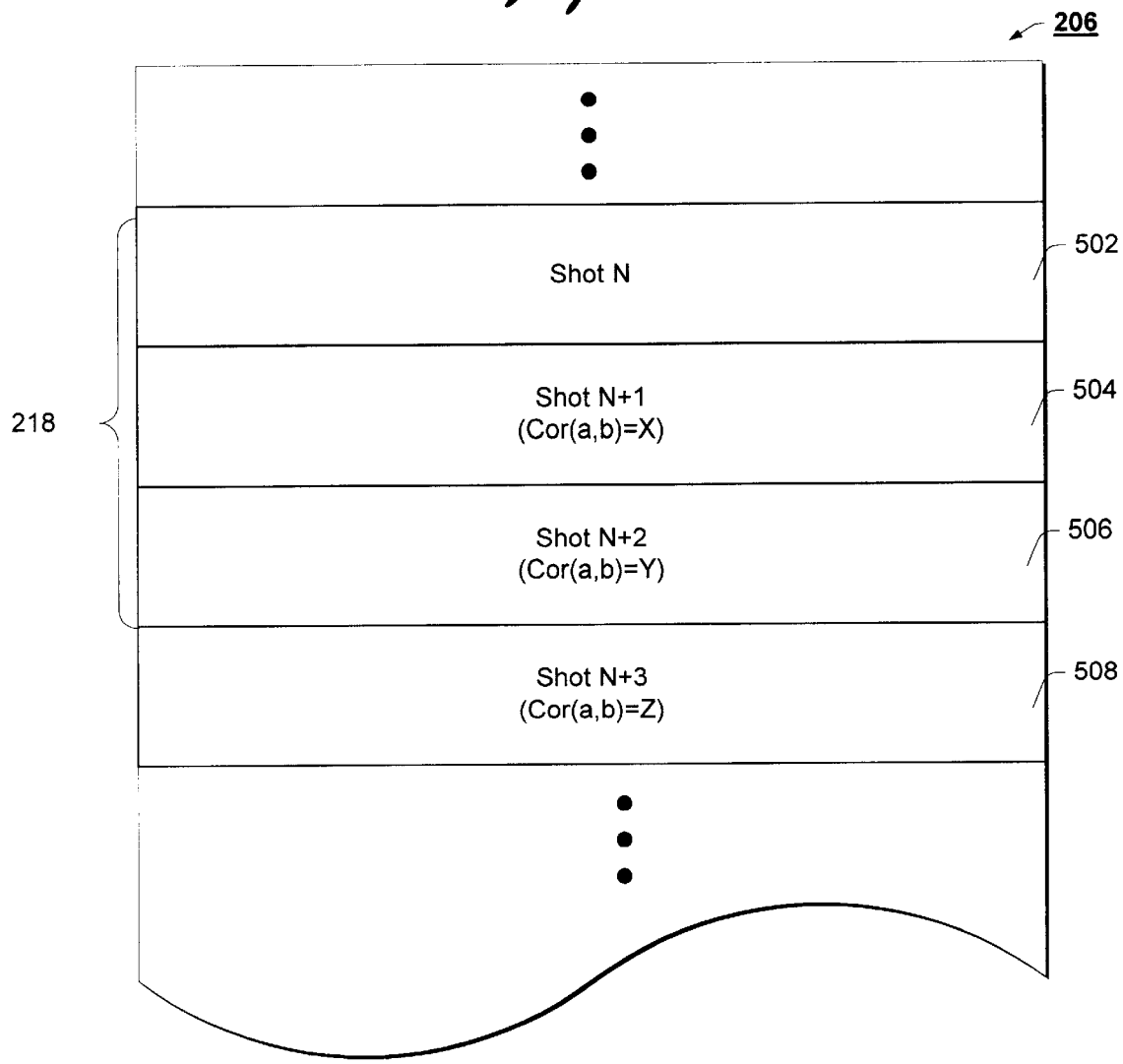
FIG. 5 is a graphical illustration of a data structure comprising an expanding scene window, according to one aspect of the present invention.

FIG. 5 graphically illustrates storage/memory 206 including an expanding scene window 218, in accordance with one aspect of the present invention. As introduced above, the expanding window 218 is used to group shots with similar semantic content, as defined by the correlation measure.

Spatio-temporal Analysis Function

In addition to, or in place of, color object analyzer 212, controller(s) 202 may selectively invoke an instance of spatio-temporal slice analysis function 214 to identify semantic similarity between shots, from which discrete scenes are identified. As shown, temporal slice analysis function 214 includes motion analysis function 220 and spatial analysis function 222. As will be described in greater detail below, temporal slice analysis function 214 cuts one or more horizontal and vertical one-dimensional (1D) slices from frames in successive shots to quantify motion patterns of the slices, and select key-frames to represent each motion segment of a shot. Based, at least in part, on the quantified features from the 1D slices, controller(s) 202 invoke an instance of correlation detector 216 to measure the similarity between the quantified features from adjoining shots to identify scene boundaries. Again, unlike the prior art, the temporal slice analysis function identifies semantic cohesion between shots to identify media scenes.

Figure 6:
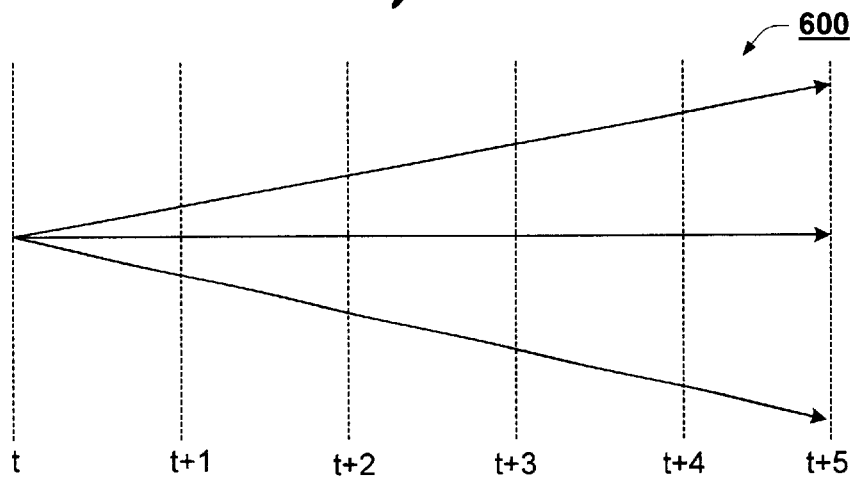
FIG. 6 is a graphical illustration of co-occurrence matrices used in temporal slice analysis, according to one aspect of the present invention.

According to one implementation, temporal slice analysis function 214 cuts 1D slices from the vertical and horizontal planes of received media and selectively invokes an instance of motion analysis function 220. Motion analysis function 220 iteratively partitions slices of each shot into smaller segments, each with consistent motion pattern(s). In two-dimensional spatio-temporal slices, temporal texture contains information indicative of motion trajectory. According to one implementation, traditional texture analysis methods are used such as, for example, co-occurrence matrix computation, to characterize motion patterns in a shot. According to one implementation, fifteen (15) co-occurrence matrices are computed to model the trajectories across five (5) scans in three (3) different directions, while thirty (30) features representing the smoothness and contrastness of each matrix is extracted. An example of the fifteen co-occurrence matrices is depicted with reference to FIG. 6.

According to one implementation, motion analysis function 220 characterizes the motion of each segment within a shot in accordance with one of the following 4 types based, at least in part, on the underlying motion of a shot: 1) no, or slight motion; 2) zoom-in or zoom-out; 3) pan; and 4) title. Based, at least on the motion pattern for each segment of a consistent motion pattern, one or more key-frames are selected according to the following rules:

1) no, or slight motion: select an arbitrary frame for indexing
2) zoom-in or zoom-out: select the first and the last frame for indexing
3) pan: select the corresponding vertical slice for indexing
4) title: select the corresponding horizontal slice for indexing Once indexed, each shot will be represented by the features of a set of one or more key-frames extracted based at least partly on the above motion analysis. The features of key-frames could be color histograms, or other image features. Based, at least in part, on features of the key-frames of shots, correlation detector calculates a similarity measure for the shots, to determine whether the shots are semantically related and, if so, controller 202 segments the shots into a scene, which is at least temporarily stored in memory 228. In one embodiment, controller 202 calculates the similarity between shots by identifying the histogram intersection between key-frames of two shots. Also, as introduced above, according to one embodiment, media analysis agent 104 utilizes an expanding window to dynamically generate a scene from shots meeting a threshold of semantic similarity.

As used herein, storage/memory 206 and input/output interface(s) 208 are each intended to represent those elements as they are well known in the art. Storage/memory 206 is utilized by media analysis agent 104 to maintain, at least temporarily, media content 224, expanding scene window 226 and/or is identified scenes 228. The I/O interface(s) 208 enable media analysis agent 104 to communicate with external elements and systems, facilitating a distributed architecture and remote operation.

Application(s) 210 are intended to include a wide variety of application(s) which may use, or be used by, media analysis engine 204 to automatically identify semantically cohesive shots for scene segmentation. In this regard, application(s) 210 may well include a graphical user interface (GUI), a media player, a media generator, a media database controller, and the like.

Given the foregoing, it is to be appreciated that media analysis agent may well be implemented in a number of alternate embodiments. According to one implementation, media analysis agent 104 is implemented in software as a stand-alone application, as a subset of a higher-level multimedia application such as, for example, a media decoder application, a media rendering application, a browser application, a media player application, and the like. Alternatively, media analysis agent 104 may well be implemented in hardware, e.g., in an application specific integrated circuit (ASIC), a controller, a programmable logic device (PLD), in a multimedia accelerator peripheral, and the like. Such alternate implementations are anticipated within the scope and spirit of the present invention.

Example Operation and Implementation

Having introduced the operating environment and functional elements of media analysis agent 104 with reference to FIGS. 1–6, above, the operation of the system will now be developed more fully below with reference to FIGS. 7–10, below. For ease of illustration, and not limitation, the operation of media analysis agent 104 will be developed below in the context of semantically segmenting video media. However, those skilled in the art will appreciate that the media analysis agent 104 may well be extended to semantically segment other types of media such as, for example, audio content.

FIG. 7 illustrates a flow chart of an example method for dynamically segmenting media into semantically similar units, in accordance with one embodiment of the present invention. More specifically, in accordance with the illustrated example implementation, FIG. 7 presents an example method for dynamically segmenting video content into scenes based, at least in part, on a semantic similarity between the shots comprising the scenes.

As shown, the method of FIG. 7 begins by receiving an indication to segment media content, block 702. More particularly, controller 202 of media analysis agent 104 receives the indication from a local application (e.g., 210) or from an external source, i.e., via I/O interface(s) 208.

In response, media analysis agent 104 invokes an instance of media analysis engine 204 to analyze the identified media content to identify semantic similarity between shots comprising the media, block 704. As introduced above, media analysis engine 204 selectively invokes color object analyzer 212 to perform color object segmentation, and/or temporal slice analysis function 214 to perform temporal slice analysis of the media content. Based, at least in part on such analysis(es), correlation detector 216 is invoked to identify shots which are statistically semantically cohesive.

In block 706, shots which are found to be statistically semantically related are grouped together to form a scene of semantically related media content. As introduced above, once correlation detector 216 determines that a shot is semantically related to prior and/or subsequent shots, the shot is added to an expanding window (218) of shots which define a scene. Utilization of the expanding window 218 relieves media analysis agent 104 from the cumbersome computation complexities commonly associated with the prior art.

Figure 8:
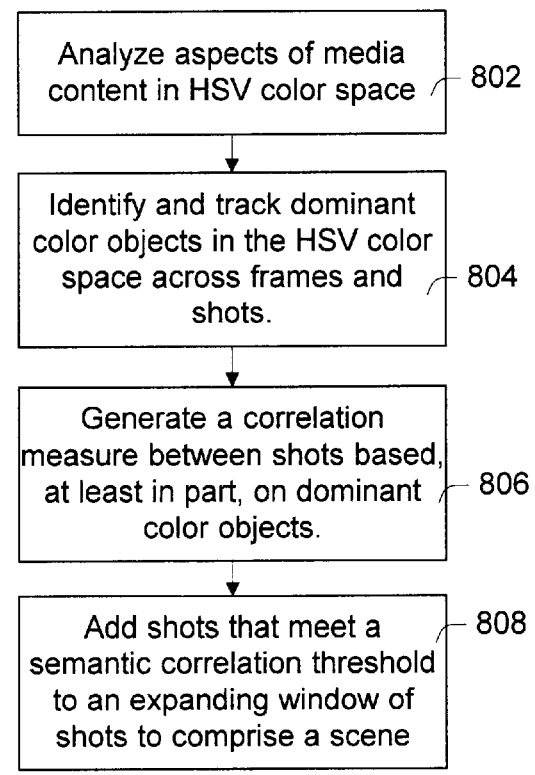
FIG. 8 is a flow chart of an example method of color object segmentation to identify semantic similarity between shots of media content, in accordance with one aspect of the present invention.

FIG. 8 illustrates a flow chart of an example method of color object segmentation, according to one aspect of the present invention. In accordance with the illustrated example embodiment, the method begins with block 802 wherein the media content is analyzed in an HSV color space. That is, the content from a frame is quantized in the HSV color space by color quantizer 218.

In block 804, dominant objects are identified and tracked in the HSV color space across frames and shots. More specifically, as introduced above, controller(s) 202 identify objects within the HSV color space, and track such objects across frame boundaries. Little movement in the position of objects between frames is an indication of similar semantic structure.

In block 806, information regarding the dominant color objects within the HSV color space are sent to correlation detector 216, which generates a measure of semantic similarity based, at least in part, on the dominant color objects in successive shots. In block 808, shots that are statistically semantically similar to other shots are grouped in an expanding window of shots. Once all of the semantically similar shots are identified (and are, thus, retained in the expanding window), the shots are defined as a scene, and stored for subsequent access and retrieval.

Figure 9:
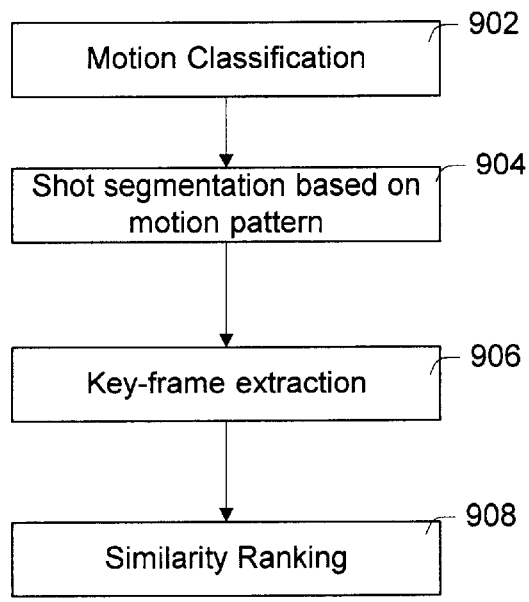
FIG. 9 is a flow chart of an example method of temporal slice analysis to identify semantic similarity between shots of media content, in accordance with one aspect of the present invention.

FIG. 9 illustrates a flow chart of an example method for temporal slice analysis, in accordance with one aspect of the present invention. As introduced above, media analysis engine 204 may selectively invoke temporal slice analysis function 214 as an alternative, or in addition, to color object analyzer 212 to identify semantically similar shots for segmentation as a scene. Unlike the color object analyzer 212, temporal slice analysis function 214 analyzes motion and spatio-temporal texture attributes of received media content to segment scenes.

Thus, in accordance with the illustrated example embodiment of FIG. 9, the method begins by extracting one-dimensional horizontal and vertical slices from one or more frames of one or more consecutive shots, block 902. Motion analysis function 220 iteratively partitions the slices into smaller segments based, at least in part, on the motion attributes of the segments, in block 904.

In block 906, controller(s) 202 selectively invokes temporal analysis function 222 to extract key-frames of the shot based on motion pattern analysis, and extract features of these key-frames to represent the visual content of the shot. In accordance with the illustrated example embodiment, introduced above, temporal analysis function 222 extracts one or more of the motion, color and/or temporal texture attributes of the key frames to represent the visual content of the shot.

In block 908, the identified features of key-frames of shots are provided to correlation detector 216, which develops a statistical measure of semantic similarity between shots based, at least in part, on these features. As above, shots with a statistically similar semantic context are grouped together to form a scene. As above, controller 202 may well employ the expanding window 218 to group shots in scene segmentation.

Alternate Embodiment(s)

Figure 10:
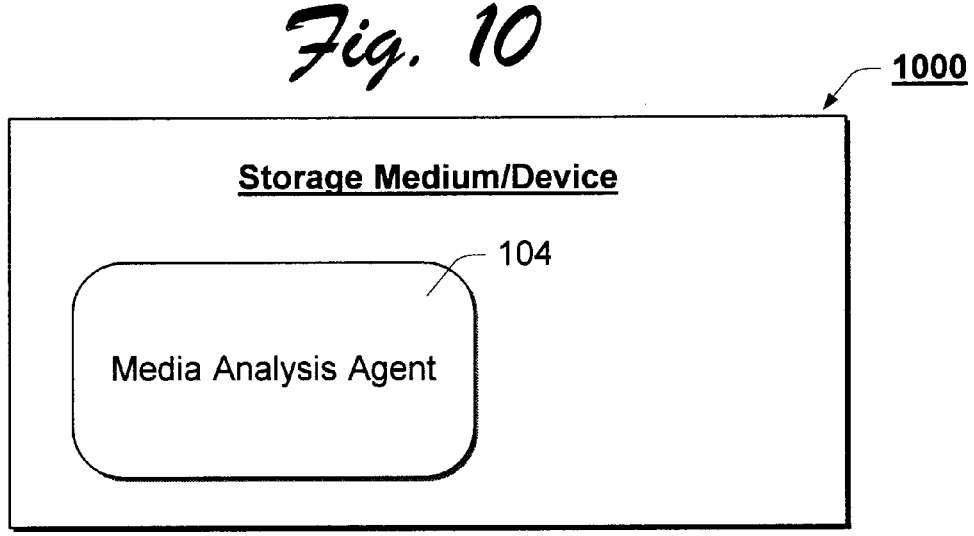
FIG. 10 is a block diagram of an example storage medium having stored thereon a plurality of executable instructions including at least a subset of which that, when executed, implement a media analysis agent incorporating the teachings of the present invention.

FIG. 10 is a block diagram of a storage medium having stored thereon a plurality of instructions including instructions to implement the teachings of the present invention, according to yet another embodiment of the present invention. In general, FIG. 10 illustrates a storage medium/device 1000 having stored thereon a plurality of executable instructions including at least a subset of which that, when executed, implement the media analysis agent 104 of the present invention.

As used herein, storage medium 1000 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 1000 need not be co-located with any host system. That is, storage medium/device 1000 may well reside within a remote server communicatively coupled to and accessible by an executing system. Accordingly, the software implementation of FIG. 10 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. For example, the inventive concepts presented herein may well be used to identify distinct audio content (e.g., songs) on a storage medium populated with a plurality of such audio content (e.g., a music CD). In accordance with this alternate implementation, an application 210 of media analysis agent 104 generates a color representation of the audio content on the storage medium. Any of a number of techniques may well be used to perform this audio to visual transform such as, for example, spectral analysis and the like. Once the audio to visual transform is completed, media analysis agent 104 selectively invokes color object analyzer 212, color quantizer 218 and correlation detector 216 to identify semantically distinct audio content from the plurality of audio content in accordance with the teachings of the present invention, disclosed above. Thus, it is to be appreciated that the specific features and steps are disclosed as but an example implementation of the broader inventive concepts introduced herein.

What is claimed is:

1. A computer-implemented method comprising:
   identifying successive shots of received media content;
   generating color histograms associated with frames in the successive shots;
   identifying dominant color objects within the color histograms;
   tracking the dominant color objects in the color histograms across the frames;
   detecting shot boundaries based, at least in part, on a relative position of the dominant color objects across the frames; and
   generating correlation scores for the successive shots based, at least in part, on analysis of the dominant color objects.

2. A computer-implemented method according to claim 1, wherein the media content is received from a remote provider and/or local storage.

3. A computer-implemented method according to claim 1, wherein the correlation scores reflect semantic correlation between the successive shots.

4. A computer-implemented method according to claim 1, wherein identifying dominant color objects within the color histograms comprises identifying the twenty top color objects having most significant color information for the frames as the dominant color objects.

5. A computer-implemented method according to claim 1, wherein generating color histograms associated with frames in the successive shots comprises:
   projecting pixels of a frame, and/or DC blocks of an intra-encoded frame, into a quantized color space; and
   generating a normalized distribution of the pixels and/or blocks to create the color histogram for each frame.

6. A computer-implemented method according to claim 5, wherein the quantized color space is the hue, saturation and value (HSV) color space.

7. A computer-implemented method according to claim 1, further comprising:
   generating a dynamically sized, expanding window of shots that defines a scene;
   generating a correlation score between at least one of the shots in the dynamically sized, expanding window of shots and a new shot; and
   adding the new shot to the dynamically sized, expanding window of shots based, at least in part, on the generated correlation score.

8. A computer-implemented method according to claim 7, wherein the generated correlation score reflects, at least in part, a correlation of color objects in the shots.

9. A computer-implemented method according to claim 7, wherein generating the correlation score comprises:
   identifying an intersection of color histograms associated with each of two or more shots.

10. A storage medium comprising a plurality of executable instructions including a subset of which that, when executed, implement a computer-implemented method according to claim 1.

11. A computing system comprising:
    a storage medium including a plurality of executable instructions; and
    an execution unit, coupled to the storage medium, to execute at least a plurality of the executable instructions to implement a computer-implemented method according to claim 1.

12. A computer-implemented method comprising:
    analyzing color information associated with received media content in a color space to identify one or more color objects;
    tracking the color objects through the received media content; and
    quantifying a correlation between shots to identify a scene based, at least in part, on the tracking of the color objects.

13. A computer-implemented method according to claim 12, wherein analyzing color information comprises:
    projecting pixels of each frame, or DC blocks of intra-encoded frame(s) into a quantized color space; and
    generating a normalized distribution of the pixels and/or blocks to form a color histogram of the media content.

14. A computer-implemented method according to claim 13, further comprising:

identifying local maximum points in the color histogram; and defining a color object as a sphere of N quantization units surrounding each of the identified local maximums.

15. A computer-implemented method according to claim 14, wherein the color object is defined as a sphere of three (3) quantization units surrounding identified local maximums.

16. A computer-implemented method according to claim 14, wherein tracking color objects through the media content comprises:

selecting one or more color objects in the color space associated with two frames; and generating a correlation score for the frames denoting a likelihood that a color object appearing in each of the frames is the same color object.

17. A computer-implemented method according to claim 16, wherein generating the correlation score between frames comprises:

locating the center point of a color object in each of two frames; and calculating a relative position of each of the center points of the color object in each frame, wherein if the relative position of the color objects do not deviate by a predetermined threshold, the color objects are identified as a common color object.

18. A computer-implemented method according to claim 12, further comprising:

generating a shot color histogram to include only color objects with the longest duration across frames comprising an identified shot.

19. A computer-implemented method according to claim 18, wherein quantifying a correlation between shots comprises:

calculating a histogram intersection between two shot color histograms to determine semantic correlation between shots.

20. A computer-implemented method according to claim 19, further comprising:

grouping shots in an expanding window of semantically correlated shots when the correlation score between shots exceeds a predetermined threshold.

21. A computer-implemented method according to claim 20, wherein the group of shots comprises a scene.

22. A computer-implemented method according to claim 12, further comprising:

grouping shots in an expanding window of semantically correlated shots when the correlation score between shots exceeds a predetermined threshold.

23. A storage medium comprising a plurality of executable instructions which, when executed, implement a computer-implemented method according to claim 12.

24. A computing system comprising:

a storage medium including a plurality of executable instructions; and an execution unit, coupled to the storage medium, to access and execute at least a subset of the plurality of executable instructions to implement a computer-implemented method according to claim 12.

25. A computer-implemented method comprising:

identifying color objects within a color space associated with shots of received media;

tracking the color objects in the color space across shots to generate a correlation score between shots; and segmenting the received media content into scenes based, at least in part, on the correlation score.

26. A computer-implemented method according to claim 25, wherein the color objects are dominant color objects.

27. A computer-implemented method according to claim 25, further comprising:

extracting one or more slices from frames of received media to analyze one or more spatio-temporal attributes of frame(s) of the received media;

generating a correlation score between frames based, at least in part, on the spatio-temporal attributes of the frames; and selecting segment boundaries within a shot based, at least in part, on the correlation score between frames.

28. A computer-implemented method according to claim 25, wherein segmenting comprises:

generating a correlation score between identified shots; and populating a dynamically expanding window with shots whose correlation score exceeds a predetermined threshold.

29. A computer-implemented method according to claim 28, wherein generating the correlation score comprises:

selecting one or more key-frames for each segment of an identified shot based, at least in part, on the spatio-temporal attributes of the frames; and generating the correlation score between identified shots based, at least in part, on visual features of the key-frames of the shots.

30. A storage medium comprising a plurality of instructions which, when executed, implement a media analysis agent to identify color objects within a color space associated with shots of received media, track the color objects in the color space across shots to generate a correlation score between shots, and segment the received media content into scenes based, at least in part, on the correlation score.

31. A storage medium according to claim 30, wherein the color objects are dominant color objects.

32. A storage medium according to claim 30, further comprising instructions to extract one or more slices from frames of received media to analyze one or more spatio-temporal attributes of frame(s) of the received media, generate a correlation score between frames based, at least in part, on the spatio-temporal attributes of the frames, and select shot boundaries based, at least in part, on the correlation score between frames.

33. A storage medium according to claim 30, further comprising instructions to generate a correlation score between identified shots, and populate a dynamically expanding window with shots whose correlation score exceeds a predetermined threshold.

34. A computing system comprising:

a disk drive to removably receive a storage medium according to claim 30; and an execution unit, coupled to the disk drive, to execute at least a subset of the plurality of instructions on the removably receive storage medium to implement the media analysis agent.

35. A computing system comprising:

a memory device, to receive and provide media content; and a media analysis agent, coupled to the memory device, and configured to generate color histograms associated with shots in the media content, identify color objects from local maximums in the color histograms, track the color objects across shots to identify shots with semantically similar frames, and segment the received media content into scenes having shots with semantically similar frames.

36. A computing system according to claim 35, wherein the media analysis agent comprises:
a color object analyzer to project pixels of media frame(s), and/or DC blocks of intra-encoded frame(s), into a quantized color space and generate a color histogram of the frame(s).

37. A computing system according to claim 35, wherein the color objects are dominant color objects.

38. A computing system according to claim 35, wherein the media analysis agent further comprises:
a correlation detector, to receive one or more attributes associated with a plurality of shots from the color object analyzer and calculate a correlation score between two or more of the shots.

39. A computing system according to claim 38, wherein the media analysis agent further comprises:
a dynamically sized expanding window, coupled to the correlation detector, to retain semantically correlated shots defining a scene until all shots are statistically analyzed for inclusion in the scene.

40. A computing system according to claim 35, wherein the media analysis agent comprises:
a temporal slice analyzer, to extract one-dimensional slice(s) from one or more frames and analyze one or more spatio-temporal attributes of the slices to detect shot boundaries.

41. A computing system according to claim 40, wherein the media analysis agent further comprises:
a correlation detector, to receive one or more attributes associated with a plurality of shots from the temporal slice analyzer and calculate a correlation score between two or more of the shots.

42. A computing system according to claim 41, wherein the media analysis agent further comprises:
a dynamically sized expanding window, coupled to the correlation detector, to retain semantically correlated shots defining a scene until all shots are statistically analyzed for inclusion in the scene.

43. A computer-implemented method comprising:
analyzing color information associated with received media content in a color space to identify one or more color objects, comprising:
projecting pixels of each frame, or DC blocks of intra-encoded frame(s) into a quantized color space;
generating a normalized distribution of the pixels and/or blocks to form a color histogram of the media content;
identifying local maximum points in the color histogram; and
defining a color object as a sphere of N quantization units surrounding each of the identified local maximums;
tracking the color objects through the received media content to identify shots, comprising:
selecting one or more color objects in the color space associated with two frames; and
generating a correlation score for the frames denoting a likelihood that an object appearing in each of the frames is the same object; and
quantifying a correlation between shots to identify a scene based, at least in part, on the analyzed color information associated with the received media content.

44. A method according to claim 43, wherein generating the correlation score between frames comprises:
locating the center point of a color object in each of two frames; and
calculating a relative position of each of the center points of the object in each frame, wherein if the relative position of the objects do not deviate by a predetermined threshold, the objects are identified as a common object.

45. A method according to claim 43, further comprising:
generating a shot color histogram to include only color objects with the longest duration across frames comprising an identified shot.

46. A method according to claim 45, wherein quantifying a correlation between shots comprises:
calculating a histogram intersection between two shot color histograms to determine semantic correlation between shots.

47. A method according to claim 46, further comprising:
grouping shots in an expanding window of semantically correlated shots when the correlation score between shots exceeds a predetermined threshold.

48. A method according to claim 47, wherein the group of shots comprises a scene.

49. A computing system comprising:
a memory device, to receive and provide media content; and
a media analysis agent, coupled to the memory device, to analyze one or more attributes of media content to identify semantic similarity between elements of the received content, and segment the received media content into scenes of semantically correlated elements, the media analysis agent further comprising:
a color object analyzer to project pixels of media frame(s), and/or DC blocks of intra-encoded frame(s), into a quantized color space and generate a color histogram of the frame(s), the color object analyzer being further configured to identify color space objects from local maximums in the color histogram, and tracks color space objects across frames to identify shots of semantically similar frames.

50. A computing system according to claim 49, wherein the media analysis agent further comprises:
a correlation detector, to receive one or more attributes associated with a plurality of shots from the color object analyzer and calculate a correlation score between two or more of the shots.

51. A computing system according to claim 50, wherein the media analysis agent further comprises:
a dynamically sized expanding window, coupled to the correlation detector, to retain semantically correlated shots defining a scene until all shots are statistically analyzed for inclusion in the scene.

* * * * *

UNITED STATES PATENT AND TRADEMARK OFFICE
CERTIFICATE OF CORRECTION

PATENT NO. : 6,724,933 B1   Page 1 of 1
DATED : April 20, 2004
INVENTOR(S) : Lin et al.

It is certified that error appears in the above-identified patent and that said Letters Patent is hereby corrected as shown below:

Column 2,
Line 14, delete "to" between "not" and "produce"

Signed and Sealed this

Sixth Day of July, 2004

JON W. DUDAS
*Acting Director of the United States Patent and Trademark Office*